(12) United States Patent
Ashie et al.

(10) Patent No.: US 12,543,761 B2
(45) Date of Patent: Feb. 10, 2026

(54) LIQUID ANIMAL DIGESTS INCLUDING DAIRY FAT

(71) Applicant: Société des Produits Nestlé S.A., Vevey (CH)

(72) Inventors: Isaac Ashie, Ballwin, MO (US); Haiqing Yu, St. Louis, MO (US); Pascal Vanacker, Amiens (FR)

(73) Assignee: Société des Produits Nestlé S.A., Vevey (CH)

( * ) Notice: Subject to any disclaimer, the term of this patent is extended or adjusted under 35 U.S.C. 154(b) by 371 days.

(21) Appl. No.: 18/183,399

(22) Filed: Mar. 14, 2023

(65) Prior Publication Data

US 2023/0345971 A1    Nov. 2, 2023

Related U.S. Application Data

(60) Provisional application No. 63/362,414, filed on Apr. 4, 2022.

(51) Int. Cl.
| | |
|---|---|
| *A23K 10/20* | (2016.01) |
| *A23K 20/105* | (2016.01) |
| *A23K 20/158* | (2016.01) |
| *A23K 40/30* | (2016.01) |
| *A23K 50/42* | (2016.01) |

(52) U.S. Cl.
CPC ............ *A23K 10/20* (2016.05); *A23K 20/105* (2016.05); *A23K 20/158* (2016.05); *A23K 40/30* (2016.05); *A23K 50/42* (2016.05)

(58) Field of Classification Search
None
See application file for complete search history.

(56) References Cited

U.S. PATENT DOCUMENTS

| | | | | |
|---|---|---|---|---|
| 3,857,968 A | * | 12/1974 | Haas | A23K 10/14 426/805 |
| 4,804,549 A | * | 2/1989 | Howley | A23K 20/158 426/805 |
| 5,532,010 A | * | 7/1996 | Spanier | A21D 13/24 426/94 |
| 8,496,981 B2 | * | 7/2013 | Zicker | A61P 43/00 426/2 |
| 10,222,387 B2 | | 3/2019 | McGrane et al. | |
| 2006/0228448 A1 | | 10/2006 | Boileau et al. | |
| 2006/0257455 A1 | * | 11/2006 | Chen | A23L 27/201 426/635 |
| 2013/0122154 A1 | * | 5/2013 | Villagran | A23K 40/20 426/89 |
| 2015/0056347 A1 | * | 2/2015 | Fournier | A23K 20/10 426/302 |
| 2019/0174796 A1 | | 6/2019 | Callejon et al. | |
| 2019/0350227 A1 | | 11/2019 | Girot et al. | |

FOREIGN PATENT DOCUMENTS

| | | | | |
|---|---|---|---|---|
| CH | 628216 A5 | * | 2/1982 | ............ A23C 15/14 |
| JP | H04222560 A | | 8/1992 | |

OTHER PUBLICATIONS

Feldman CH 628216 Translation (Year: 1982).*
International Search Report and Written Opinion to PCT/IB2023/052476 dated Mar. 14, 2023.

* cited by examiner

*Primary Examiner* — Jennifer McNeil

(57) ABSTRACT

A liquid animal digest (LAD) can include hydrolyzed animal tissue, antioxidant, and from about 0.1 wt % to about 5 wt % dairy fat based on a total weight of the LAD.

9 Claims, No Drawings

LIQUID ANIMAL DIGESTS INCLUDING DAIRY FAT

CROSS REFERENCE TO RELATED APPLICATION

This application claims the benefit of and priority to U.S. Provisional Application Ser. No. 63/362,414 filed Apr. 4, 2022, the disclosure of which is incorporated in its entirety herein by this reference.

BACKGROUND

Liquid animal digest (LAD) is often used as a flavoring for animal feed, such as for domestic pet food for companion animals, e.g., canines or dogs, felines or cats, hamsters, etc. LAD can be produced by chemical and/or enzymatic hydrolysis of animal tissue, e.g., hydrolyzed meat and/or fat from chicken, pork, beef, lamb, etc., which results in shorter chain proteins and/or peptides of the raw animal tissue. In preparation, animal tissue may be exposed to heat, physical shearing, acids, and/or enzymes, which assist with breaking down proteins and/or fats that may be present in the raw animal tissue. As LAD is used as a flavoring for animal feed, such as pet food, the enhancement of the palatability of the pet food with LAD incorporated thereon and/or therein can likewise improve the regular eating habits and nutrition of pets.

DETAILED DESCRIPTION

The introduction of dairy fat in relatively small amounts to liquid animal digest (LAD), which can ultimately be incorporated into various pet foods, can provide enhanced palatability for animals consuming these pet foods. In accordance with this, an LAD can include hydrolyzed animal tissue, antioxidant, and from about 0.1 wt % to about 5 wt % dairy fat based on a total weight of the LAD. Though some benefit can be seen at as low as 0.1 wt % dairy fat content, in some examples, non-lipolyzed dairy fat in particular can be particularly beneficial when included at from greater than 1 wt % to about 5 wt %. Likewise, lipolyzed dairy fat can provide good palatability enhancement when included at from greater than 2 wt % to about 5 wt %. In some examples, from about 5 wt % to about 25 wt % of a choline compound can be included in the LAD, which can still further enhance the palatability of pet food compositions to which the LAD is incorporated. In one embodiment, a pet food composition can include about 0.01 wt % to about 1.5 wt % of a choline compound based on a total weight of a finished pet food product. Examples of dairy fat that can be used include milk fat, butter fat, cheese fat, or a combination thereof.

In other examples, pet food compositions can include kibble and LAD coated on or incorporated into the kibble. The LAD can include hydrolyzed animal tissue, antioxidant, and dairy fat. The dairy fat can be present as part of the pet food composition at from about 0.001 wt % to about 0.15 wt %. In some examples, the dairy fat can be non-lipolyzed. Non-lipolyzed dairy fat can be included as part of the pet food composition in some examples at from about 0.015 wt % to about 0.15 wt %. In other examples, the dairy fat can be lipolyzed. Lipolyzed dairy fat can be included as part of the pet food composition in some examples at from about 0.025 wt % to about 0.15 wt %. In further detail, the pet food composition can include from about 0.01 wt % to about 0.5 wt % of a choline compound. Furthermore, the pet food composition can also include from about 1 wt % to about 12 wt % of animal fat (in addition to any hydrolyzed animal fat provided by the LAD). Again, examples of dairy fat that can be used include milk fat, butter fat, cheese fat, or a combination thereof.

In other examples, methods of preparing a pet-consumable composition can include preparing LAD, and in some instances, applying the LAD to kibble to form pet food compositions. In one example, the method can include hydrolyzing proteins and fats in raw animal tissue to form a peptide mixture, introducing heat and reactant compounds to the peptide mixture to initiate a thermal reaction, and recovering an LAD. In this method, dairy fat can be introduced with the LAD so that from about 0.1 wt % to about 5 wt % dairy fat is present based on a total weight of the LAD. In some examples, the dairy fat can be added prior to hydrolyzing the proteins and fats. In other examples, the method can include adding from about 5 wt % to about 25 wt % of a choline compound to the LAD based on the total weight of the LAD. In still other examples the choline compound can be added in whole or in part to the LAD with the remaining portion to be added in other coatings such that the total amount of the choline compound in the finished pet food product to be about 0.01 wt % to about 1.5 wt %, or in one aspect, from about 0.01 wt % to about 0.5 wt %. In further detail, when the method is used to make a pet food composition, the method can further include applying the LAD to kibble resulting in a pet food composition with a dairy fat content (after drying) at from about 0.001 wt % to about 0.15 wt %. In some examples, applying the method can include applying from about 1 wt % to about 12 wt % animal fat to the pet food composition based on a total weight of the pet food composition.

It is noted that when discussing examples related to liquid animal digest (LAD), the pet food compositions, and/or the methods of preparing the pet-consumable compositions described herein, such discussions can be considered applicable to one another whether or not they are explicitly discussed in the context of that example. Thus, for example, when discussing the "antioxidant" in the context of LAD, such disclosure is also relevant to and directly supported in the context of pet food compositions and methods of preparing the pet-consumable compositions, and vice versa.

Furthermore, terms used herein will have their ordinary meaning in the relevant technical field unless specified otherwise. In some instances, there are terms defined more specifically throughout the specification, with a few more general terms included at the end of the specification. These more specifically defined terms have the meaning as described herein.

Liquid Animal Digests

Liquid animal digests (LADs) of the present disclosure can include hydrolyzed animal tissue, antioxidant, and from about 0.1 wt % to about 5 wt % dairy fat based on a total weight of the LAD. In some instances, from about 0.1 wt % to about 1.5 wt % of a choline compound can likewise be included in the LAD. The process of making LAD can include processing raw animal tissue, such as meat and/or fat from chicken, pork, beef, lamb, etc., resulting in shorter chain proteins and/or peptides than that which is inherently predominant in the raw animal tissue. The breaking down of the raw animal tissue to shorter hydrolyzed proteins and/or peptides from its raw protein and/or fat content may occur by exposing the raw animal tissue to heat, physical shearing, acids, and/or enzymes, for example. Prior to breakdown of the proteins and/or fats, the raw animal tissue may include highly concentrated and sometimes gelatinous proteins. In some more specific examples, enzymatic hydrolysis and heat can be used together as an effective way of hydrolyzing the proteins and/or fats, resulting in the presence of hydrolysates that provide acceptable digests for use in providing animals with good nutrition and/or palatability.

Referring now to the raw animal tissue more specifically, any type of raw animal tissue can be used to prepare the LAD (and pet food compositions) of the present disclosure. Raw animal tissue that when hydrolyzed produces enhanced flavoring to a base pet food product, such as kibble, as it relates to an animal's diet can be particularly beneficial.

For purposes of the present disclosure, the term "raw animal tissue" refers to any animal tissue, including meat, fat, bone, organs, sinew, etc., that may be collected and used to make the LAD of the present disclosure. The Association of American Feed Control Officials (AAFCO), for example, defines animal digest to include material which results from chemical and/or enzymatic hydrolysis of clean and undecomposed animal tissue, and that the animal tissues used shall be exclusive of hair, horns, teeth, hooves and feathers, except in such trace amounts as might occur unavoidably in good factory practice and shall be suitable. Thus, in many examples, ground up or pulverized raw animal tissue that can be used to make LAD that conforms with the AAFCO definition and can include meat from muscle, organs (viscera), epithelial tissue, connective tissue, fat, etc., from sources such as beef, chicken, pork, lamb, venison, sheep, fish, crustaceans, insects, shellfish, or the like. In more specific detail, the raw animal tissue may include some meat or other tissue that is edible but which may not otherwise be going to the human food supply chain. For example, the raw animal tissue may include "meat mix," which can be a ground up mixture of animal, e.g., pork, liver, spleen, trachea, lung, etc.

On the other hand, the term "hydrolyzed animal tissue," "hydrolyzed protein," "hydrolyzed fat," or the like relates to raw animal tissue that has since been broken down to shorter chain length proteins, peptides, and/or fatty acids based on an average chain length compared to proteins and/or fats of the raw animal tissue source. The hydrolyzed animal tissue may be broken down via any of a number of processes, including processes that utilize heat, shearing, acids, and/or enzymes, for example.

In some example preparations of LAD, raw animal tissues can be ground up and then processed to result in an intermediate product which includes the hydrolyzed animal tissue. This process is referred to herein as "digestion," which is the process of breaking down the raw animal tissue and adding certain components, thus leaving the hydrolyzed animal tissue behind. As a note, "digestion" or "digestion process" does not refer to digestion that occurs within the GI tract of an animal, but rather is a term of art that refers to the breaking down of fats and/or proteins in the preparation of animal digests. To illustrate, processing raw animal tissue via digestion may include the use of enzymes, such as proteases to break down the proteins in the raw animal tissue, and in some instances, lipases to break down the fats in the animal tissue. Enzymes are not consumed during digestion and thus are considered to be processing aids. Other chemicals or components can be included additively or alternatively to break down fats and/or proteins. In further detail regarding the enzymes that can be added, e.g., proteases and/or lipases, these enzymes are sometimes referred to as "technical enzymes," which are not the same as the natural enzymes that may inherently be present in the raw animal tissue. As an example, with specific reference to proteases, there are multiple types of technical enzymes or enzyme packages that can be used for digestion, including endoproteases which sever amino acids within the proteins or peptides and/or exopeptidases which cleave off amino acids at the end of proteins or peptides. Examples of endoproteases include chymosin, pepsin, trypsin, papain, bromelain, subtilisin, etc. Some raw animal tissue, such as animal viscera, may be used that inherently includes proteases and/or lipases. These enzymes can either be leveraged for use during digestion, or heat or other processes can be used to inactivate some or all of those enzymes in favor of the addition of technical enzymes.

If heat is used during the digestion process, heating can be carried out by any of a number of processes, such as steam injection, jacket heating, etc. In some examples, steam injection can be particularly useful as it uses a relatively small amount of water, e.g., from about 5 wt % to about 25 wt % or from about 7.5 wt % to about 20 wt % water based on the total weight of the components used to prepare the LAD, and can also provide rapid heating to facilitate the breaking down of the raw animal tissue to hydrolyzed animal tissue. Heating can also be used to arrest or stop enzymatic activity of some enzymes. For example, some raw animal tissue includes protease and lipase enzymes, but at temperatures above about 135° F., many of those enzymes may become inactivated. As the temperature rises, other enzymes also can become inactive. Thus, in some examples, technical enzymes can be added that survive at temperatures greater than about 135° F. or greater than about 150° F. so that the added technical enzymes are those which primarily act to hydrolyze the raw animal tissue. In some systems, the processing temperatures may be from about 135° F. to about 175° F., from about 145° F. to about 175° F., from about 150° F. to about 170° F., from about 150° F. to about 165° F., from about 150° F. to about 160° F., or from about 155° F. to about 165° F., for example. Temperatures outside of these ranges can be used, as these ranges are provided for example purposes only based on many of the technical enzymes that can be used in carrying out digestion. In accordance with this, a heating temperature profile can be selected that allows for some or all enzymatic activity to occur during digestion.

After digestion, an intermediate digest composition can be formed that is in condition to undergo a "reaction process" or "reaction." which is sometimes referred to as the "Maillard reaction." The Maillard reaction is the stage or process where additional flavoring of the digests occurs. More specifically, the Maillard reaction is an organic chemical reaction where reducing compounds, such as sugars, react with amino acids to form a complex mixture of volatile and non-volatile compounds. This reaction can be classified as a non-enzymatic browning reaction, which can occur at a variety of temperatures from room temperature to well above room temperature. However, in many reaction processes, the process is a "thermal reaction" process occurring at elevated temperatures, e.g., from about 190° F. to about 220° F. which may be higher in temperature than that used during the digestion process. The reaction process can generate several flavoring compounds that may be broken down from other flavoring compounds, depending on the favoring compound added, the temperature applied, the pH and/or the time profiles used. In some examples, an amino compound, such as an amino acid, amino peptides, and/or amino proteins, can be combined with a reducing sugar, e.g., monosaccharides (such as xylose, ribose, fructose or glucose), disaccharides (such as lactose), to start the reaction under heat. Additionally, during the reaction process, compounds used to start the reaction (or other added compounds) can be selected for use to meet a flavoring profile, depending on the type of animal the LAD will be used to feed. Thus, any of a number of specific compounds can be used in the reaction process to provide various flavoring profiles, such as any of the naturally occurring amino acids, amino proteins and/or peptides, xylose, ribose, fructose, glucose, lactose, etc. that may be added to modify the flavor and/or enhance the nutrition of the LAD being prepared.

Antioxidant(s) can be added during digestion while breaking down proteins and/or fat. Antioxidant(s) can likewise be added after digestion, such as before, during, or after the reaction process. In particular, antioxidants can be used to prevent oxidation that is often associated with the presence of fats. By including from about 0.01 wt % to about 0.2 wt % antioxidant(s), the resultant LAD can be protected from oxidation. Examples of antioxidants that can be selected for use include natural or synthetic antioxidants, such as butylated hydroxyanisole, butylated hydroxytoluene, propyl gallate, octyl gallate, tocopherols, rosemary extract, ascorbic acid, or a combination thereof.

Enhanced palatability of pet food compositions can be achieved by incorporating an LAD with a base pet food, or kibble, which includes dairy fat so that the final LAD used includes from about 0.1 wt % to about 5 wt %, from about 0.2 wt % to about 4 wt %, from about 0.5 wt % to about 4 wt %, from about 1 wt % to about 5 wt %, from about 1 wt % to about 4 wt %, from about 1 wt % to about 3 wt %, or from about 1.5 wt % to about 3.5 wt % of the dairy fat. The dairy fat can be added at any stage or multiple stages of the preparation process of the LAD. However, in some examples, even more significant palatability enhancement may be achievable by including greater than 1 wt % non-lipolyzed dairy fat, e.g., from greater than 1 wt % to about 5 wt %, from about 1.5 wt % to about 5 wt %, or from about 2 wt % to about 5 wt %, in the LAD. On the other hand, with respect to lipolyzed dairy fat, more significant palatability enhancement may be achievable when including greater than 2 wt % dairy fat in the LAD, e.g., from greater than 2 wt % to about 5 wt %, from about 2.5 wt % to about 5 wt %, or from about 3 wt % to about 5 wt %.

The dairy fat can be in any form of dairy fat, including milk fat, butter fat, and/or cheese fat. For example, the dairy fat can be collected when cheese is kittled, where the paste-like dairy fat can be added to the mixture of raw animal tissue, enzymes, antioxidant, etc. Dairy fat may likewise be collected when processing milk, butter, etc. As heating may be used along with technical enzymes to break down the raw animal tissue, e.g., proteins and/or fats, these same temperatures can provide a good environment to melt a paste-like dairy fat if the dairy fat is added during digestion. The same may likewise be the case when the dairy fat is added prior to, during, or after the reaction, e.g., thermal reaction, Maillard reaction, etc., occurs. Thus, in accordance with examples of the present disclosure, dairy fat can be included in the LAD, and may be added at any stage of the preparation process.

Dairy fats tend to be rich in short-chain fatty acids, which are initially shorter in chain average length than the free fatty acids found in raw animal tissue. It is noted that either non-lipolyzed dairy fat and/or lipolyzed dairy fat can be used. Non lipolyzed dairy fat is initially shorter in chain length (on average) than that provided by the raw animal tissue. However, for an even shorter fatty acid chain or free fatty acid (FFA) inclusion, in some examples, dairy fat that is included may be lipolyzed. In either case, the inclusion of the dairy fat can enhance the palatability of pet food composition to which the LAD is applied, whether the dairy fat is in its natural state or has undergone lipolysis either before, during, or after the digestion or reaction processes used to prepare the LAD.

"Lipolysis" or "lipolyzed" refers to the hydrolysis of lipids, and in dairy products, can produce free fatty acids, as mentioned. Free fatty acids, when present at too high of a concentration, can produce unpleasant tastes. On the other hand, at low concentrations, free fatty acids can provide a desirable taste, e.g., some cheeses with small concentrations of free fatty acids have a taste profile that benefits from their presence. Lipolysis is caused by lipases, which may be inherently present in dairy products or which may be introduced by bacterial lipases. Thus, the term "non-lipolyzed" does not mean that there has been no lipolysis, but rather that the dairy fat has not been introduced to any lipolysis agents and/or lipases that would lipolyze the dairy fat. On the other hand, the term "lipolyzed" when referring to dairy fat indicates that dairy fats have been introduced to lipolysis agents and/or lipases that may not otherwise be naturally present in the dairy fat being used.

In accordance with industry standards, there are generally two types of LAD, namely natural LAD and non-natural LAD. Natural LAD can include some additives used for processing but not others. Otherwise, the LAD is considered to be non-natural. For example, an LAD is considered "natural" LAD if it contains ingredients/additives such as naturally derived amino acids, amino-peptides, amino-proteins, reducing sugars, and/or other natural additives, but cannot use certain artificial additives and/or preservatives. In further detail, the AAFCO defines natural as a feed or feed ingredient derived solely from plant, animal, or mined sources, either in its unprocessed state or having been subject to physical processing, heat processing, rendering, purification, extraction, hydrolysis, enzymolysis or fermentation, but not having been produced by or subject to a chemically synthetic process and not containing any additives or processing aids that are chemically synthetic except in amounts as might occur in good manufacturing practices. For example, additives such as tocopherols, rosemary extract, and ascorbic acid may be included as antioxidants in accordance with the definition of natural ingredients as defined by the AAFCO. Additives such as BHA, PG, BHT, and OG are examples of non-natural ingredients as defined by the AAFCO.

In one example of the present disclosure, though it has been found that the presence of dairy fat in the LAD generally provides improved palatability, the improvement in palatability may be even more pronounced with natural LADs (relative to non-natural animal digests). This enhanced palatability can be achieved by including the dairy fat in the LAD during manufacturing so that the final LAD produced includes from about 0.1 wt % to about 5 wt % dairy fat, but may be more significantly observed when the dairy fat is included at greater than 1 wt % (based on the total weigh of the LAD), for both natural and non-natural dairy fat, e.g., from greater than 1 wt % to about 5 wt %, from about 1.5 wt % to about 5 wt %, from about 2 wt % to about 5 wt %, or from greater than 2 wt % to about 5 wt %.

In further detail, a choline compound can likewise be added to the LAD, along with the dairy fat, and together a synergistic effect may be achievable with respect to enhanced palatability. In other words, by including both dairy fat (lipolyzed or non-lipolyzed) and a choline compound in a natural or non-natural LAD, the palatability of a pet food composition incorporated with the LAD can have an even increased palatability than when either is added alone. In one example, a choline compound can be added to the LAD after carrying out the digestion process and the reaction process, though it can be added at any time earlier in the processes as well. In some examples, the choline compound can be added to the LAD, resulting in from about 0.1 wt % to about 1.5 wt %, from about 0.1 wt % to about 1 wt %, from about 0.2 wt % to about 0.8 wt %, or from about 0.3 wt % to about 0.7 wt % choline compound content in a finished food product once the LAD is applied to a kibble or other food product. As part of the LAD, the choline compound can be present in amounts ranging from about 1 wt %, 2 wt %, 3 wt %, 4 wt %, 5 wt %, 6 wt %, 7 wt %, 8 wt %, 9 wt %, 10 wt %, or 15 wt % to about 5 wt %, 10 wt %, 15 wt %, 20 wt %, or even 25 wt %. In one example, the choline compound can be present in the LAD in an amount from about 5 wt % to about 25 wt %. Examples of choline compounds that can be used include any of a number of choline salts, phospholipids, hydroxides, or the like. For example, the choline compound may be a choline halide, such as choline chloride. In other examples, the choline compound may be a choline phospholipid such as phosphatidylcholine. Other choline compounds that can be used include choline hydroxide, for example.

Pet Food Compositions

In accordance with other examples herein, pet food compositions can include kibble and LAD coated on or incorporated into the kibble. The LAD used to prepare the pet food compositions can include hydrolyzed animal tissue, antioxidant(s), and dairy fat. The dairy fat can be coated on and/or incorporated in the base pet food component, which includes the kibble but may also include other formulations or components, e.g., a separate animal fat coating, etc. that may likewise become part of the pet food composition. The dairy fat can become part of the pet food composition as a whole at an amount from about 0.001 wt % to about 0.15 wt %, from about 0.002 wt % to about 0.15 wt %, from about 0.005 wt % to about 0.15 wt %, from about 0.01 wt % to about 0.1 wt %, or from about 0.01 wt % to about 0.1 wt %.

In examples of the present disclosure, the dairy fat can be from milk fat, butter fat, cheese fat, or a combination thereof. LAD as described herein can be prepared and applied to or incorporated into various pet food bases/pellets, which are described herein generally as "kibble." The dairy fat may remain on the surface and/or may be incorporated into the kibble beneath its surface at an average depth below the surface of from about 1 mm to being incorporated throughout the kibble. In some examples, the dairy fat may be incorporated or soaked up so it is present through the kibble. There may be a concentration gradient of dairy fat within the kibble, with higher concentrations of dairy fat being present closer to the surface of the kibble, and lower concentrations further away from the surface.

Details related to the LAD and preparation thereof with respect to the LAD are applicable to the pet food compositions and are incorporated herein, with the understanding that in some instances, the LAD may be incorporated into the kibble and dried to some degree, whether or not there is a specific drying process implemented. Furthermore, when referring to the dairy fat content being present at from about 0.001 wt % to about 0.15 wt %, that weight percentage (and other weight percentages hereinafter related to the pet food composition) refers to the dairy fat content that remains with the pet food composition based on the entire weight of the pet food composition after preparation. For example, application of LAD into kibble can include the use of LAD with from about 0.1 wt % to about 5 wt % (based on the total weight of the LAD), but after incorporation into the kibble at an application weight from about 1 wt % to about 3 wt % (based on the total weight of the pet food composition), the dairy fat can remain with the pet food composition at from about 0.001 wt % to about 0.15 wt %. These values can likewise be used to calculate the weight percentage of the solids content from the LAD content that may remain with the pet food composition as applied to the pet food composition at a wet coating. If some drying occurs of the LAD, relative to the total weight of the pet food composition, a small amount of drying may be considered to be de minimis and the range of about 0.001 wt % to about 0.15 wt % should adequately cover the range of dairy fat content that can be incorporated into the pet food composition with good palatability. If any drying occurs prior to packaging, it can be that which occurs in natural ambient air. In some examples, other drying processes may be implemented, such as by application of heat, air flow, etc. On the other hand, if it is desired to avoid drying, then humidified ambient air can be used to ameliorate some of the drying that may otherwise occur prior to packaging. Alternatively, immediate packaging can be carried out if the objective is to retain some moisture. Though an application range from about 1 wt % to about 3 wt % may be used to determine how much dairy fat (or other components) remain with the pet food composition based on the dairy fat concentration in the LAD, it is notable that application ranges outside of this range can be used, such as application of the LAD to the base pet food (which includes the kibble) at from about 0.5 wt % to about 7.5 wt %, from about 1 wt % to about 5 wt %, etc.

In various examples, the dairy fat incorporated in the pet food composition can be non-lipolyzed or lipolyzed. Though the total dairy fat content can range from 0.001 wt % to 0.15 wt % dairy fat in the pet food composition, in some instance with non-lipolyzed dairy fat, the dairy fat content of the pet food composition can be from about 0.015 wt % to about 0.15 wt % for better palatability with some animals. In other examples with lipolyzed dairy fat, the dairy fat content of the pet food composition can be from about 0.025 wt % to about 0.15 wt % to achieve further enhanced palatability with some animals.

In further detail, the dairy fat incorporated in the pet food composition can be applied using a natural LAD, or can be applied using a non-natural LAD. Whether natural or non-natural LAD is used that contains the dairy fat for application to the kibble, the dairy fat content of the pet food composition can provide still further palatability enhancement at from greater than 0.01 wt % to about 0.15 wt %, in some examples.

In further detail, the LAD that may be used to enhance the palatability of kibble can include other additives, such as antioxidant(s), which can be added to protect the hydrolyzed animal fat from unwanted oxidation. As mentioned, antioxidant(s) can be added for the digestion process, but can be added at a later time in the overall process of preparing the LAD. It is also noted that stabilizing components or formulation components can be added during digestion or at any stage during the preparation of the LAD as well, as previously described.

Furthermore, as with the LAD, the pet food composition can be prepared to include a choline compound, which may be applied as part of the LAD, or may be applied separately. By including both dairy fat and a choline compound, the palatability of pet food compositions has an increased palatability for some domestic pets, such as dogs and cats, which is even greater than when either compound is used in the LAD alone. In some instances, synergistic improvement in palatability is shown in the Examples hereinafter. The choline compound can be as previously described with respect to the LAD and can be present in the pet food composition (as a whole based on a total weight of the pet food composition) at from about 0.01 wt % to about 1.5 wt %, from about 0.01 wt % to about 1 wt %, from about 0.1 wt % to about 1 wt %, or from about 0.3 wt % to about 0.7 wt %, for example. The choline compound can be included from choline compound sources, such as choline salts, phospholipids, hydroxides, or the like, e.g., choline halides, choline phospholipids, choline hydroxide, etc., as previously described.

In some examples, other palatability and/or nutrition additives can likewise be applied to or incorporated in the kibble, such as a separate application of animal fat, e.g., rendered fat of an animal, or even plant oil. The animal fat can be applied as a coating that stays on the surface and/or is incorporated into the kibble, similarly as described with respect to the LAD with the dairy fat. The animal fat can be used that may not have been partially hydrolyzed or remains fully unhydrolyzed. Examples of animal fat or rendered animal fat that can be used include beef tallow, rendered pork fat, chicken fat, fish fat, etc. The animal fat can be applied within a weight range of from about 1 wt % to about 12 wt %, from about 2 wt % to about 12 wt %, from about 3 wt % to about 10 wt %, or from about 4 wt % to about 10 wt %, based on a total weight of the pet food composition. Application of additional animal fat to the kibble can provide additional palatability enhancement.

Once the LAD is prepared, in some instances, the LAD formed can be cooled and applied directly to animal feed pellets or kibble using any of a number of techniques, e.g., spraying, soaking, admixing, etc., and then dried. Alternatively, the LAD can be dried first and then applied to admix with the kibble.

Methods of Preparing Pet-Consumable Compositions

In accordance with other examples of the present disclosure, a method of preparing a pet-consumable composition can include hydrolyzing proteins and fats in raw animal tissue to form a peptide mixture, introducing heat and reactant compounds to the peptide mixture to initiate a thermal reaction, and recovering an LAD. The method can further include introducing a dairy fat so that the LAD includes from about 0.1 wt % to about 5 wt % dairy fat based on a total weight of the LAD. The dairy fat can be added prior to hydrolyzing the proteins and fats, or can be added during or after hydrolysis of the proteins and fats of the raw animal tissue. In some examples, from about 0.1 wt % to about 1.5 wt % of a choline compound can be added to the LAD (based on the total weight of the LAD). In some examples, other additives can be included in the LAD, such as an antioxidant, a choline compound, and other components as previously described in the context of the LAD. Thus, the pet-consumable composition can be in the form of the LAD. The term "pet-consumable composition" is a more general term that includes both the LAD as well as the pet food compositions prepared using the LAD described herein. The LAD prepared in accordance with this method can be applied to kibble, resulting in a pet food composition with a dairy fat content after drying at from about 0.001 wt % to about 0.15 wt %, or any of the other subranges herein. If the choline compound is included, it may be present in the pet food composition at from about 0.01 wt % to about 1.5 wt %, or any other subranges described herein, for example. Other components can be applied to the kibble, as previously described in the context of the pet food composition. For example, the method can include applying (e.g., incorporation) animal fat to or into the kibble at from 1 wt % to about 12 wt %, or any of the other subranges herein, based on a total weight of the pet food composition.

Definitions

The term "pet" refers to domesticated or other animals that are kept by humans as companion animals, such as avian; equine; feline; canine; rodent, e.g., hamsters, guinea pigs, mice, gerbils, etc.; lagomorph, e.g., rabbits; ferrets; cattle; goats; sheep; donkeys; pigs, etc.

The term "enhanced palatability" or "increased palatability" indicates a preference by a pet for a specific food item over another comparable food item that is prepared in the same manner, but without any added dairy fat (and in some instances a choline compound). This can be verified by a "two bowl" (or paired) test with a sample of animals, where some preference is notable on average. The preference may be as little as about an 8% difference, e.g., 54% preference of one bowl vs 46% preference of the other bowl (54/46). A more significant palatability enhancement may score 60/40 on a two-bowl test but is more notable where there is a 20% difference.

The term "about" means plus or minus 20% of a numeric value; in one aspect, plus or minus 10%; in another aspect, plus or minus 5%; and in one specific aspect, plus or minus 2%. For example, in one aspect where about is plus or minus 20% of a numeric value, the phrase "from about 10% to about 20%" could include a range from 8% to 24% or 12% to 16%, including any subranges therein.

As used herein, "comprising" or "including" language or other open-ended language can be substituted with "consisting essentially of" and "consisting of" as if such transition phrase is expressly included in such embodiments.

All percentages expressed herein are by weight of the composition on a dry matter basis unless specifically stated otherwise. A contrary example in the present disclosure is weight ranges based on a total weight of the LAD.

As used herein, ranges are in shorthand so as to avoid having to list and describe each and every value within the range. Any appropriate value within the range can be selected, where appropriate, as the upper value, lower value, or the terminus of the range, and thus should be interpreted flexibly to include the numerical values explicitly recited as the limits of the range, and also to include individual numerical values or sub-ranges encompassed within that range as if numerical values and sub-ranges are explicitly recited. As an illustration, a numerical range of "about 1 wt % to about 5 wt %" should be interpreted to include the explicitly recited values of about 1 wt % to about 5 wt %, and also to include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting one numerical value. Furthermore, such an interpretation should apply regardless of the breadth of the range or the characteristics being described.

As used herein, the singular form of a word includes the plural, and vice versa, unless the context clearly dictates otherwise. Thus, the references "a," "an," and "the" are generally inclusive of the plurals of the respective terms. For example, reference to "an LAD," "the pet food composition," "a method," etc. includes a plurality of such liquid animal digests, pet food compositions, methods, etc.

The term "example(s)" or "embodiment(s)," particularly when followed by a listing of terms, is merely exemplary and illustrative and should not be deemed to be exclusive or comprehensive.

The methods and compositions and other advances disclosed herein are not limited to particular methodology, protocols, and reagents described herein because, as the skilled artisan will appreciate, they may vary. Further, the terminology used herein is for the purpose of describing particular embodiments only, and is not intended to and does not limit the scope of that which is disclosed or claimed.

Unless defined otherwise, all technical and scientific terms, terms of art, and acronyms used herein have the meanings commonly understood by one of ordinary skill in the art in the field(s) of the invention, or in the field(s) where the term is used. Although any compositions, methods, articles of manufacture, or other means or materials similar or equivalent to those described herein can be used in the practice of the present invention, certain compositions, methods, articles of manufacture, or other means or materials are described herein.

As used herein, a plurality of elements, compositional components, and/or materials may be presented in a common list for convenience. However, these lists should be construed as though individual members of the list are individually identified as separate and unique members. Thus, no individual member of such list should be construed as a de facto equivalent of any other member of the same list solely based on presentation in a common group without indications to the contrary.

EXAMPLES

Features of the present disclosure can be further illustrated by the following examples, although it will be understood that these examples are included merely for purposes of illustration and are not intended to limit the scope of the invention unless otherwise specifically indicated.

Example 1—Preparation of Liquid Animal Digest

Several separate formulations including multiple ingredients were used to prepare several unique liquid animal digests (LADs) by sequentially following two processes, namely 1) a digestion process, followed by 2) a thermal reaction process. The digestion process was carried out by admixing ground raw animal tissue in the form of pork and chicken organ meats and muscle tissue, BHA (non-natural) or tocopherols (natural) as the antioxidant, and multiple technical enzymes (including subtilisin (Alcalase) protease). The admixture was heated using 10-12 wt % steam at 120-170° F. for 45 minutes resulting in an intermediate digest composition that included hydrolyzed animal tissue (broken down by the enzymes under heat) and the antioxidant. Residual amounts of the enzymes (both added technical enzymes and endogenous enzymes present in the tissues) may remain in the intermediate digest composition. Next, a thermal reaction process was carried out after digestion with the addition of other additives, such as Maillard reaction precursors, flavorings and/or preservatives. More specifically, the thermal reaction was carried out at about 180-220° F. for 30 minutes. Some of the LAD prepared were "natural" as defined by the AAFCO, with additives in the reaction including AAFCO natural preservatives and ingredients. For the preparation of "non-natural" LAD, additives in the thermal reaction process included sugars, amino acids, and preservatives considered non-natural by the AAFCO definition.

During the process of preparing the LAD, four different sources of added fat were individually added to the various samples at from 1 wt % to 3 wt % (based on the final weight content of the LAD). The sources of added fat selected for evaluation did not originate from the raw animal tissue and included 1) non-lipolyzed milk fat, 2) lipolyzed milk fat, 3) coconut oil, or 4) lecithin. These added fats were included in a mixture for the digestion process, but could likewise be added after the digestion process, such as for inclusion with the Maillard reaction process or after the Maillard reaction process. The resultant LAD individually formed after both the digestion process and the Maillard reaction process were cooled, acidified by adding phosphoric acid, though others can be used such as sulfuric acid, citric acid, acetic acid, etc., and then stored in preparation for application to kibble for palatability testing. Notably, some of the LAD prepared included the addition of a choline complex to determine if the choline complex would further assist with enhanced palatability when included with the milk fat. The several LAD prepared are summarized in Table 1, as follows:

TABLE 1

Liquid Animal Digests

| LAD ID | LAD Type | Added Fat Source | Added Fat Source Amount in LAD (wt %) | Choline Chloride (wt %)* |
|---|---|---|---|---|
| LAD 1 | Non-natural | Non-lipolyzed Milk Fat | 1 | — |
| LAD 2 | Non-natural | Non-lipolyzed Milk Fat | 2 | — |
| LAD 3 | Non-natural | Non-lipolyzed Milk Fat | 2 | — |
| LAD 4 | Non-natural | Non-lipolyzed Milk Fat | 2 | — |
| LAD 5 | Non-natural | Non-lipolyzed Milk Fat | 3 | — |
| LAD 6 | Non-natural | Lipolyzed Milk Fat | 1 | — |
| LAD 7 | Non-natural | Lipolyzed Milk Fat | 2 | — |
| LAD 8 | Non-natural | Lipolyzed Milk Fat | 3 | — |
| LAD 9 | Non-natural | Coconut Oil | 1 | — |
| LAD 10 | Non-natural | Lecithin | 1 | — |
| LAD 11 | Non-natural | Non-lyophilized Milk Fat | 2 | 0.5 |
| LAD 12 | Non-natural | — | — | 0.5 |
| **LAD C1 | Non-natural | — | — | — |
| LAD 13 | Natural | Non-lipolyzed Milk Fat | 1 | — |
| LAD 14 | Natural | Non-lipolyzed Milk Fat | 2 | — |
| LAD 15 | Natural | Non-lipolyzed Milk Fat | 3 | — |
| LAD 16 | Natural | Lipolyzed Milk Fat | 2 | — |
| LAD 17 | Natural | Lipolyzed Milk Fat | 3 | — |
| LAD 18 | Natural | Coconut Oil | 1 | — |
| **LAD C2 | Natural | — | — | — |

* Based on the finished food product
** Comparative Liquid Animal Digest for LAD 1-12
*** Comparative Liquid Animal Digest for LAD 13-18

Example 2—Preparation of Pet Food Compositions

Eighteen (18) different pet food compositions were prepared that independently included Nestlé Purina® Pro Plan® dog kibble each having about 7.25 wt % beef tallow (using the same formulation for all samples) as well as about 2 wt % of one of the 18 LAD applied in accordance with Table 1 (LAD 1-18). Furthermore, two (2) of the 18 LAD (LAD 11-12) included choline chloride (about 0.5 wt % based on the finished food product when applied to a kibble), also as shown in Table 1. All of the pet food compositions prepared included the same hydrolyzed animal tissue, namely pork and chicken organ meats and muscle, and the same antioxidant, namely BHA/tocopherols. The beef tallow and the individual LAD applied were sequentially applied by spraying each liquid formulation on the dog kibble.

In addition to the 18 pet food compositions prepared for evaluation, two separate comparative pet food compositions were prepared identically as described above, except that there was no additional animal fat source nor any choline chloride used in the LAD. A first comparative LAD (LAD C1) was a non-natural formulation for comparison against LAD 1-12. A second comparative LAD (LAD C2) was a natural LAD for comparison against LAD 13-18.

Example 3—Palatability of Pet Food Compositions

The LAD shown in Table 1 (LAD 1-18) as well as the two comparative LAD (LAD C1-C$_2$) were applied to dog kibble as described in Example 2. These formulations are also summarized in Table 2 as pet food compositions PFC 1-18 and PFC C1-C2, respectively. As shown in Table 2, palatability preference data was generated using a two-bowl voluntary intake study with 20 dogs per panel, each dog being independently offered both bowls with the same amount of pet food composition in each bowl. The first bowl included one of the pet food compositions of PFC 1-18, and the second bowl included either LAD C1 or LAD C2, depending on whether the PFC 1-18 offered was from one of the non-natural formulations or the natural formulations of LAD 1-18 (non-natural LAD were matched against the comparative non-natural LAD; natural LAD were matched against the comparative natural LAD).

Once the two-bowl study began, each dog in the panel had free access to both bowls. A preference score (or ratio) was generated (based on 100) as to how much of the first bowl of dog food was eaten compared to the second bowl. The values were then averaged across the 20 dogs in the same panel and given a palatability preference score or ratio. Thus, a palatability preference score of 50 corresponds with a ratio of 50/50, indicating no preference, on average, across the panel of dogs in the panel for one bowl over the other. A palatability preference score of 60 corresponds with a ratio of 60/40, indicating a fairly significant preference for the first dog bowl on average across the panel of 20 dogs. A palatability preference score of 40 corresponds with a ratio of 40/60, indicating a fairly significant preference for the second dog bowl over the first dog bowl on average across the panel of 20 dogs.

Various pet food compositions (PFC 1-12 with non-natural LAD applied and PFC 13-18 with natural LAD applied, as per AAFCO) were tested against their respective related comparative pet food compositions More specifically, the scores for PFC 1-12 were generated as compared against the Non-natural Comparative PFC (PFC C1) in the two-bowl study, and the scores for PFC 13-18 were generated as compared against the Natural Comparative PFC (PFC C2) in the two-bowl study. The scores generated, along with a summary of the unique characteristics of the various LAD evaluated, are shown in Table 2 below:

TABLE 2

Pet Food Compositions (PFC 1-18) Palatability Preference Scores

| Pet Food Comp. ID | LAD Applied | LAD Type/Milk Fat Content of Individual Pet Food Compositions | Palatability Preference Score (%) |
|---|---|---|---|
| PFC 1 | LAD 1 | Non-natural/1 wt % Non-lipolyzed | 61.6 |
| PFC 2 | LAD 2 | Non-natural/2 wt % Non-lipolyzed | 70.6 |
| PFC 3 | LAD 3 | Non-natural/2 wt % Non-lipolyzed | 64.1 |
| PFC 4 | LAD 4 | Non-natural/2 wt % Non-lipolyzed | 66 |
| PFC 5 | LAD 5 | Non-natural/3 wt % Non-lipolyzed | 60.5 |
| PFC 6 | LAD 6 | Non-natural/1 wt % Lipolyzed | 39 |
| PFC 7 | LAD 7 | Non-natural/2 wt % Lipolyzed | 47.4 |
| PFC 8 | LAD 8 | Non-natural/3 wt % Lipolyzed | 64.4 |
| PFC 9 | LAD 9 | Non-natural/No Milk Fat (1 wt % Coconut Oil) | 49 |
| PFC 10 | LAD 10 | Non-natural/No Milk Fat (1 wt % Lecithin) | 57.9 |
| PFC 11 | LAD 11 | Non-natural/2 wt % Non-lipolyzed (0.5 wt % Choline Chloride) | 87.2 |
| PFC 12 | LAD 12 | Non-natural/No Milk Fat (0.5 wt % Choline Chloride) | 74.3 |
| *PFC C1 | LAD C1 | Non-natural/No Milk Fat | — |
| PFC 13 | LAD 13 | Natural/1 wt % Non-lipolyzed | 44.5 |
| PFC 14 | LAD 14 | Natural/2 wt % Non-lipolyzed | 77.8 |
| PFC 15 | LAD 15 | Natural/3 wt % Non-lipolyzed | 66.6 |
| PFC 16 | LAD 16 | Natural/2 wt % Lipolyzed | 77.3 |
| PFC 17 | LAD 17 | Natural/3 wt % Lipolyzed | 77.5 |
| PFC 18 | LAD 18 | Natural/No Milk Fat (1 wt % Coconut Oil) | 43.6 |
| **PFC C2 | LAD C2 | Natural/No Milk Fat | — |

*Comparative Second Bowl Formulation Used Against PFC 1-12
**Comparative Second Bowl Formulation Used Against PFC 13-18

As can be seen from the data shown in Table 2, the addition of dairy fat (namely milk fat in these examples) to LAD and applied to dog kibble resulted in a strong trend of enhanced palatability, with improved palatability (60+), significantly improved palatability (70+), and in one instance very significantly improved palatability (80+) achieved. For example, all of the pet food compositions with non-natural LAD applied which included non-lipolyzed milk fat (PFC 1-5) exceeded a preference score of 60. For pet food compositions with non-natural LAD applied including lipolyzed milk fat (PFC 6-8), the sample with greater than 2 wt % lipolyzed milk fat in the LAD (PFC 8) achieved a score exceeding 60. In this category, neither the coconut oil-containing sample (PFC 9) nor the lecithin-containing sample (PFC 10) achieved a score of 60.

With respect to pet food compositions with natural LAD applied including non-lipolyzed milk fat samples (PFC 13-15), examples with greater than 1 wt % milk fat (PFC 14-15) also achieved scores greater than 60. Surprisingly, PFC 14 including 2 wt % non-lipolyzed milk fat performed even better than PFC 15, which included 3 wt % non-lipolyzed milk fat. With respect to pet food compositions with natural LAD applied including lipolyzed milk fat samples (PFC 16-17), both examples scored greater than 70. The example that included coconut oil instead of milk fat scored poorly, with a reasonable preference for the bowl that did not include the coconut oil.

It was also surprising to note an additive effect of enhanced palatability was observed when including both added milk fat and a choline complex together, achieving the highest palatability preference score (PFC 11; Score 87.2) relative to all of the dog panels from all categories, outperforming all of the formulations where milk fat was used alone (PFC 1-8; and PFC 13-17) as well as outperforming the use of the choline complex without the milk fat additive (PFC 12 Score of 74.3) by a difference of almost 13.

In the specification, there have been disclosed certain embodiments of the invention. Although specific terms are employed, they are used in a generic and descriptive sense only and not for purposes of limitation. The scope of the invention is set forth in the claims. Obviously, many modifications and variations of the invention are possible in light of the above teachings. It is therefore to be understood that within the scope of the appended claims, the invention may be practiced otherwise than as specifically described

What is claimed is:

1. A liquid animal digest (LAD), comprising:
    hydrolyzed animal tissue;
    antioxidant; and
    dairy fat; wherein the LAD is non-natural and the dairy fat is non-lipolyzed and is present at from about 1 wt % to about 3 wt %, the LAD is natural and the dairy fat is non-lipolyzed and is present at from about 2 wt % to about 3 wt %, the LAD is non-natural and the dairy fat is lipolyzed and is present at from about 2.5 wt % to about 3.5 wt %, or the LAD is natural and the dairy fat is lipolyzed and is present at from about 2 wt % to about 3 wt %, and further including from about 5 wt % to about 25 wt % of a choline compound based on a total weight of the LAD.

2. The LAD of claim 1, wherein the dairy fat includes milk fat, butter fat, cheese fat, or a combination thereof.

3. The LAD of claim 2, wherein the LAD is a natural LAD.

4. A pet food composition, comprising:
    kibble; and
    the LAD of claim 1 coated on or incorporated into the kibble wherein the choline compound is present in an amount from about 0.01 wt % to about 1.5 wt % based on the total weight of the pet food composition.

5. The pet food composition of claim 4, wherein the pet food composition further includes from about 1 wt % to about 12 wt % of animal fat based on dry content in addition to any hydrolyzed animal fat provided by the LAD.

6. A method of preparing a pet-consumable composition, comprising:
    hydrolyzing proteins and fats in raw animal tissue to form a peptide and fatty acids mixture;
    introducing heat and reactant compounds to the peptide and fatty acids mixture to initiate a thermal reaction; and
    recovering an LAD,
    wherein the method further includes introducing a dairy fat to the LAD, wherein wherein the LAD is non-natural and the dairy fat is non-lipolyzed and is present at from about 1 wt % to about 3 wt %, the LAD is natural and the dairy fat is non-lipolyzed and is present at from about 2 wt % to about 3 wt %, the LAD is non-natural and the dairy fat is lipolyzed and is present at from about 2.5 wt % to about 3.5 wt %, or the LAD is natural and the dairy fat is lipolyzed and is present at from about 2 wt % to about 3 wt %, and further including adding from about 5 wt % to about 25 wt % of a choline compound to the LAD.

7. The method of claim 6, wherein the dairy fat is added prior to hydrolyzing the proteins and fats.

8. The method of claim 6, further including applying the LAD to kibble resulting in a pet food composition with a dairy fat content from about 0.001 wt % to about 0.15 wt % based on dry content of the pet food composition.

9. The method of claim 8, further including applying from about 1 wt % to about 12 wt % animal fat based on dry content of the pet food composition.

* * * * *